United States Patent
Ukai et al.

(10) Patent No.: US 11,433,780 B2
(45) Date of Patent: Sep. 6, 2022

(54) VEHICLE CONTROL DEVICE

(71) Applicant: HONDA MOTOR CO., LTD., Tokyo (JP)

(72) Inventors: Hayahito Ukai, Wako (JP); Shota Kawanaka, Wako (JP); Takehiro Horigome, Wako (JP); Yasuhiro Ikeda, Wako (JP); Takeshi Itagaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 87 days.

(21) Appl. No.: 17/153,277

(22) Filed: Jan. 20, 2021

(65) Prior Publication Data

US 2021/0229567 A1 Jul. 29, 2021

(30) Foreign Application Priority Data

Jan. 24, 2020 (JP) .............................. JP2020-010022

(51) Int. Cl.
*B60L 58/13* (2019.01)
*B60L 58/24* (2019.01)

(52) U.S. Cl.
CPC ............... *B60L 58/13* (2019.02); *B60L 58/24* (2019.02); *B60L 2240/545* (2013.01); *B60L 2260/32* (2013.01)

(58) Field of Classification Search
None
See application file for complete search history.

(56) References Cited

U.S. PATENT DOCUMENTS

| | | | |
|---|---|---|---|
| 2016/0355098 A1* | 12/2016 | Sakakibara | ....... H02J 7/007182 |
| 2017/0016962 A1* | 1/2017 | Iwane | .................. G01R 31/374 |
| 2019/0375298 A1* | 12/2019 | Symanow | ............... B60L 50/61 |
| 2020/0070661 A1* | 3/2020 | Akuzawa | ............ B60W 50/023 |

FOREIGN PATENT DOCUMENTS

JP 2018-058444 4/2018

* cited by examiner

*Primary Examiner* — Jared Fureman
*Assistant Examiner* — Joel Barnett
(74) *Attorney, Agent, or Firm* — Rankin, Hill & Clark LLP

(57) ABSTRACT

When replacement of a battery is detected, an automatic driving executability determination unit determines whether the battery is in a low capacity state until a predetermined time elapses, using battery information (battery charge amount, discharge performance) excluding an estimation value of a temperature of the battery, and restricts automatic driving according to such a determination result.

8 Claims, 11 Drawing Sheets

FIG.7
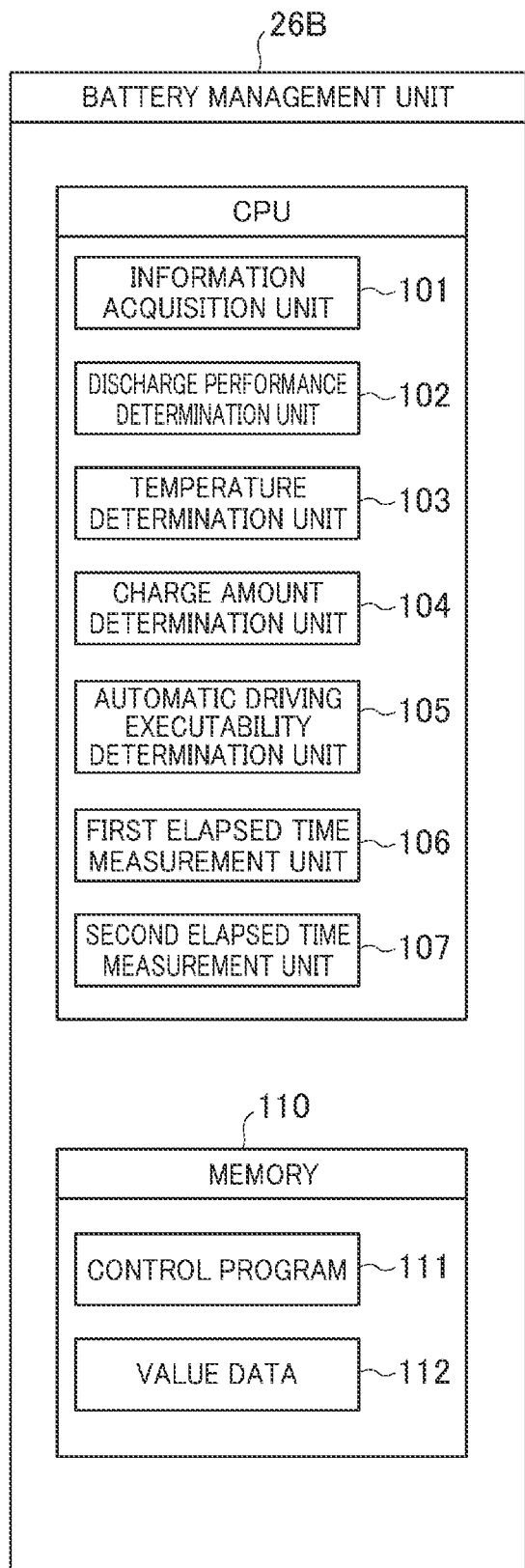
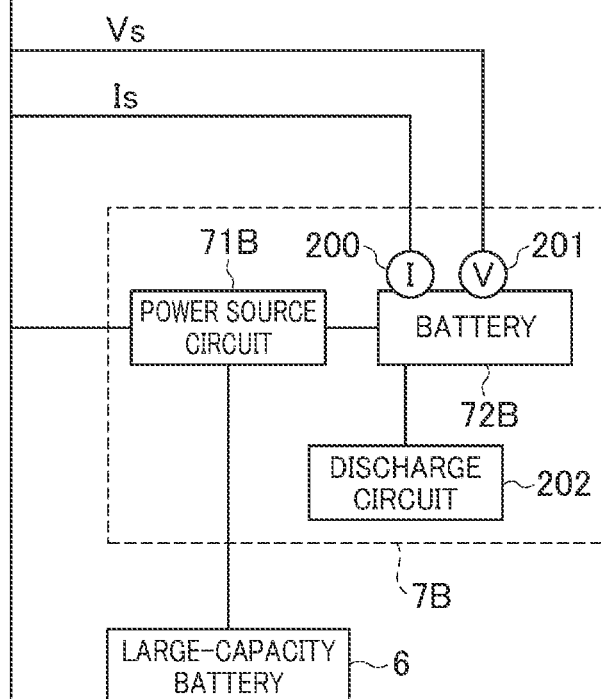

VEHICLE CONTROL DEVICE

INCORPORATION BY REFERENCE

The present application claims priority under 35 U.S.C. § 119 to Japanese Patent Application No. 2020-010022 filed on Jan. 24, 2020. The content of the application is incorporated herein by reference in its entirety.

BACKGROUND OF THE INVENTION

Field of the Invention

The present invention relates to a vehicle control device.

Description of the Related Art

A vehicle control device capable of controlling automatic driving of a vehicle has been known. In such a vehicle control device, a temperature of a battery is detected whether to be within a predetermined range for the purpose of restricting the automatic driving when an output voltage of the battery is lowered due to a drop in temperature and generated power of an alternator can hardly be supplemented, and at least some of functions of an automatic driving control is restricted when the temperature of the battery is out of the predetermined range (for example, see Japanese Patent Laid-Open No. 2018-058444).

By the way, a temperature sensor configured to acquire the temperature of the battery is often provided outside the battery, and a discrepancy is likely to occur between a temperature to be detected and a temperature of a battery liquid (also referred to as an electrolytic solution). Therefore, a learning process may be performed to estimate the temperature of the battery liquid from the temperature detected by the temperature sensor.

However, when the battery is replaced, since learning information is reset and the learning process is performed again, the discrepancy between the estimated temperature and an actual temperature of the battery liquid increases. Since the configuration of the related art does not consider the discrepancy of the temperature after the battery is replaced, the determination accuracy of the decrease in capacity of the battery due to the drop in temperature is lowered. If automatic driving immediately after the battery is replaced is prohibited every time because the lowered determination accuracy of the decrease in capacity of the battery, a user's convenience may be greatly impaired.

Accordingly, the present invention is to prevent a situation in which automatic driving is restricted based on an estimation value when an error is large, and to enable automatic driving, thereby improving a user's convenience.

SUMMARY OF THE INVENTION

In order to achieve the above-described object, an aspect of the present invention is to provide A vehicle control device capable of controlling automatic driving of a vehicle, the vehicle control device comprising a processor, wherein the processor functions as: a mounting detection unit configured to detect mounting of a battery on the vehicle; an information acquisition unit configured to acquire battery information indicating a state of the battery; and a control unit configured to restrict the automatic driving based on the battery information, wherein the battery information includes an estimation value in which information accuracy deteriorates when the battery is mounted or removed, and when the mounting of the battery is detected, by a function of the control unit, the processor performs a process of restricting the automatic driving using the battery information excluding the estimation value until a predetermined time elapses.

In the configuration described above, the estimation value may be a value obtained using a past estimation value, and the predetermined time may be a time during which a discrepancy between the estimation value and a measured value falls within an allowable range.

In the configuration described above, the battery information may include the estimation value and non-estimation information regarding output performance of the battery, and when the mounting of the battery is detected, the control unit may perform a first process of restricting the automatic driving based on the non-estimation information until the predetermined time elapses and perform a second process of restricting the automatic driving using at least the estimation value when the predetermined time elapses.

In the configuration described above, the control unit may perform, as the first process, a discharge test for testing whether the battery is capable of discharging a predetermined amount of current when the vehicle is started, in a cycle shorter than the predetermined time, acquire information obtained by the discharge test as the non-estimation information, and determine based on the acquired information whether to restrict the automatic driving.

In the configuration described above, the estimation value may include a battery temperature estimation value that is an estimation value of a liquid temperature of the battery, and the control unit may perform, as the second process, at least a process of determining whether to restrict the automatic driving, based on an amount of change in the battery temperature estimation value from a time point when the automatic driving is permitted.

In the configuration described above, the cycle may be set to a time shorter than a time required for a temperature of the battery to drop by a predetermined temperature.

In the configuration described above, when the mounting of the battery is detected, the control unit may be configured to: determine the state of the battery based on the battery information excluding the estimation value until the predetermined time elapses; determine the state of the battery using the estimation value when the predetermined time elapses; and prohibit hands-off automatic driving according to a result of each determination.

In order to achieve the above-described object, another aspect of the present invention is to provide a non-transitory computer-readable memory that records an automatic driving program causing a computer, having a processor, to execute an automatic driving process of a vehicle, wherein the automatic driving program causes the computer to execute, by the processor: a process of detecting mounting of a battery on the vehicle, a process of acquiring battery information indicating a state of the battery, and a process of restricting the automatic driving process based on the battery information, the battery information includes an estimation value in which information accuracy deteriorates when the battery is mounted or removed, and when the mounting of the battery is detected, the automatic driving program causes the processor to restrict the automatic driving process using the battery information excluding the estimation value until a predetermined time elapses.

According to the present invention, it is possible to prevent a situation in which automatic driving is restricted based on an estimation value when an error is large, and to enable automatic driving, thereby improving a user's convenience.

BRIEF DESCRIPTION OF THE DRAWINGS

FIG. 7 is a block diagram showing a configuration of a battery management ECU;

DETAILED DESCRIPTION OF THE PREFERRED EMBODIMENT

An embodiment of the present invention will be described below with reference to the drawings.

[1-1. Overall Configuration of Vehicle Control Device]

Figure 1:
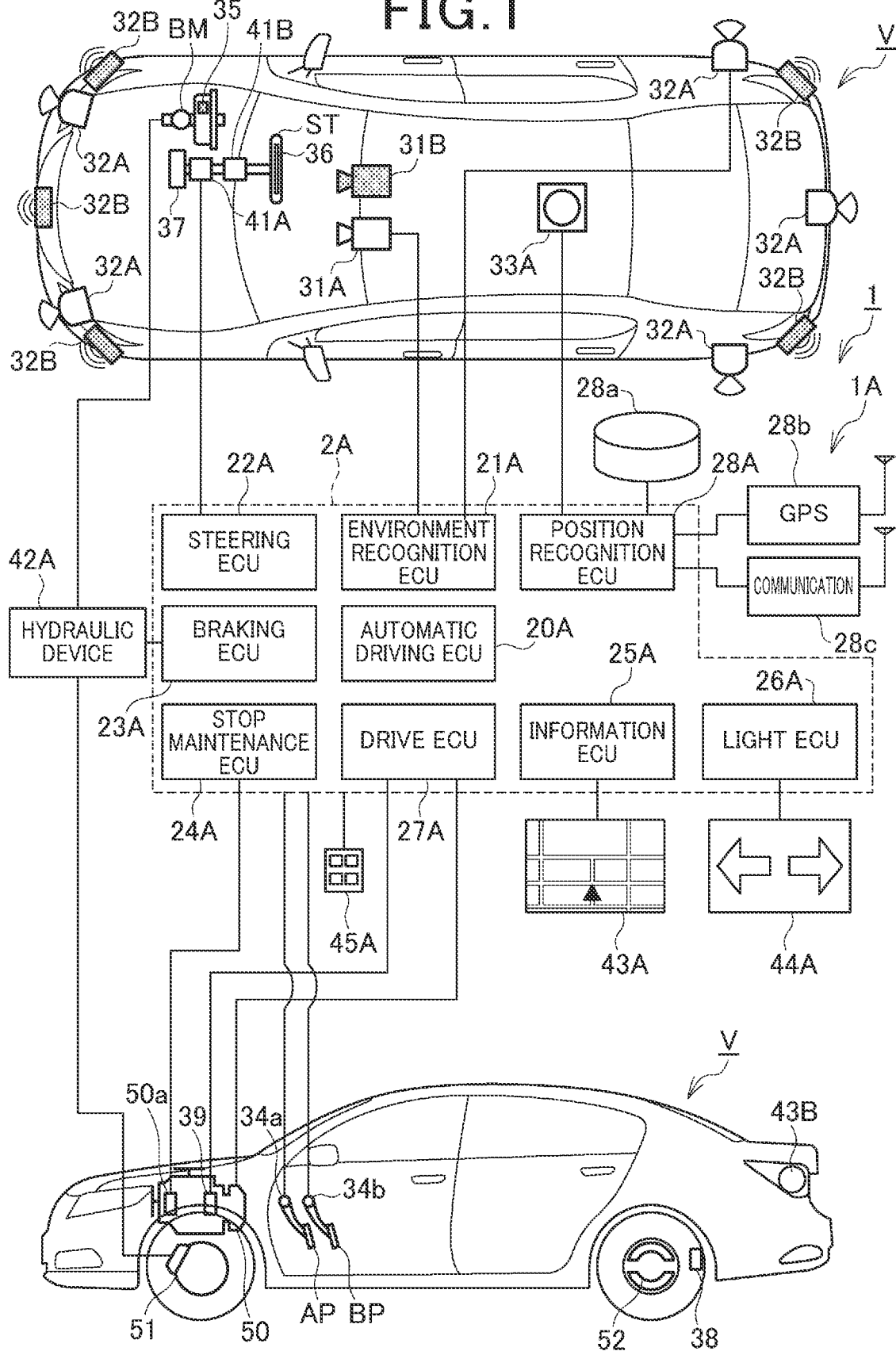
FIG. 1 is a first block diagram showing a configuration of a vehicle control device.
Figure 2:
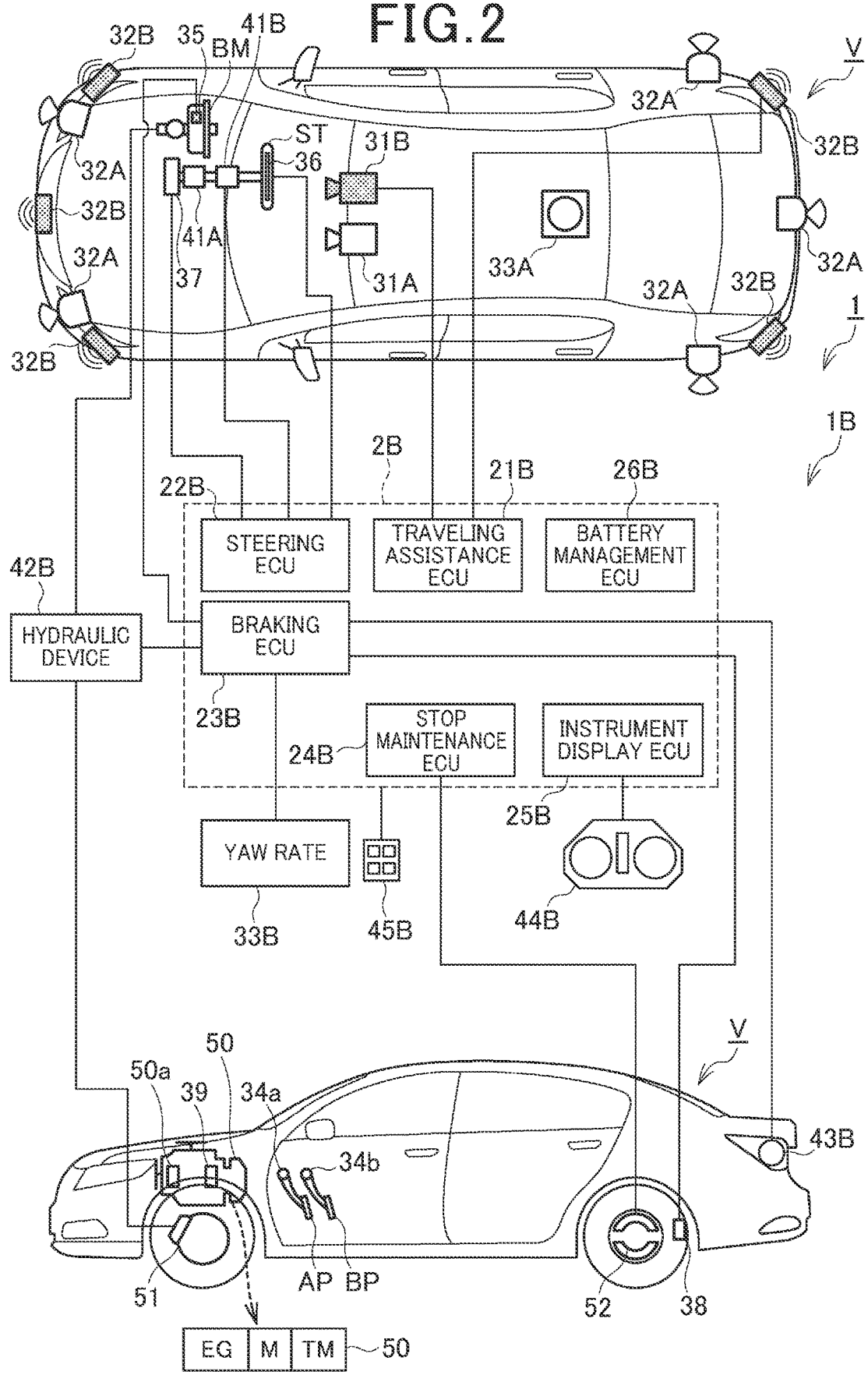
FIG. 2 is a second block diagram showing a configuration of a vehicle control device.

A configuration of a vehicle control device according to the embodiment of the present invention will be described with reference to FIGS. 1 and 2. A vehicle control device 1 according to the embodiment includes two control devices 1A and 1B for controlling a vehicle V. FIGS. 1 and 2 are a schematic plan view and a schematic side view of the vehicle V, respectively.

The control device 1A and the control device 1B multiplex a part of functions provided in the vehicle V and make it redundant, thereby improving the reliability of the vehicle control device 1. The control device 1A mainly performs automatic driving control and normal driving control in manual driving, and the control device 1B mainly performs driving assistance control related to danger avoidance.

The vehicle V according to the embodiment is a parallel hybrid vehicle, and FIG. 2 schematically shows a configuration of a power plant 50 that outputs a driving force for rotating driving wheels of the vehicle V. The power plant 50 includes an internal combustion engine EG, a motor M, and an automatic transmission TM. The motor M functions as a driving source for driving the vehicle V, and also functions as a generator during deceleration of the vehicle V to perform regenerative braking.

[1-2. Control Device 1A]

A configuration of the control device 1A will be described with reference to FIG. 1. The control device 1A includes an electronic control unit (ECU) group 2A. The ECU group 2A includes a plurality of ECUs 20A to 28A. Each of the ECUs 20A to 28A includes a processor represented by a CPU, a storage device (recording medium) such as a semiconductor memory, and an interface with an external device. The storage device stores programs executed by the processor and data used in processing of the processor. Each of the ECUs may include a plurality of processors, a plurality of storage devices, and a plurality of interfaces. The control device 1A causes the CPU to execute the program stored in the storage device, so that automatic driving of the vehicle V is executed. The number of ECUs in the ECU group 2A and the functions in charge of each of the ECUs may be appropriately changed, and may be subdivided or integrated more than those in the embodiment, for example. In FIG. 1, names of typical functions of the ECUs 20A to 28A are denoted. For example, the ECU 20A is denoted by an "automatic driving ECU".

The ECU 20A executes control related to the automatic driving of the vehicle V. In the automatic driving, the driving (acceleration of the vehicle V by the power plant 50 or the like), steering, and braking of the vehicle V are automatically performed without an operation from a driver. The ECU 20A can execute a level of automatic driving control performed in a state (referred to as hands-off) in which the driver releases hands from a steering wheel ST (also referred to as a handle). In the following, the ECU 20A will be denoted by an automatic driving ECU 20A when being described in a particularly distinctive manner from other ECUs.

The ECU 21A is an environment recognition unit configured to recognize a traveling environment of the vehicle V based on detection results of detection units 31A and 32A configured to detect a surrounding situation of the vehicle V. In the case of the embodiment, the detection unit 31A is a camera that captures an image in front of the vehicle V (hereinafter, may be referred to as a camera 31A) and is provided at a roof front part of the vehicle V. Through analysis of the image captured by the camera 31A, it is possible to extract outlines of targets and lane markers (white lines and the like) for lanes of roads. In the case of the embodiment, the detection unit 32A is a lidar (laser radar) (hereinafter, may be referred to as a lidar 32A), detects targets in the surroundings of the vehicle V, and measures a distance to the target. In the case of the embodiment, five lidars 32A are provided including two lidars provided at corners of the front part of the vehicle V, one lidar provided at the center of the rear part, and two lidars provided on sides of the rear part.

The ECU 22A is a steering control unit configured to control an electric power steering device 41A. The electric power steering device 41A includes a mechanism configured to steer front wheels in response to a driving operation (steering operation) performed by the driver on the steering wheel ST. The electric power steering device 41A includes a motor configured to assist the steering operation and exert a drive force for automatically steering the front wheels, a sensor configured to detect the amount of rotation of the motor, and a torque sensor configured to detect a steering torque imparted on the driver.

The ECU 23A is a braking control unit configured to control a hydraulic device 42A. A braking operation performed by the driver on a brake pedal BP is converted into a hydraulic pressure by a brake master cylinder BM, and then the hydraulic pressure is delivered to the hydraulic device 42A. The hydraulic device 42A includes an actuator capable of controlling the hydraulic pressures of hydraulic oil to be supplied to brake devices (for example, disc brake devices) 51 provided at the four respective wheels based on the hydraulic pressure delivered from the brake master cylinder BM. The ECU 23A performs drive control for an electromagnetic valve or the like provided in the hydraulic device 42A. In the case of the embodiment, the ECU 23A and the hydraulic device 42A constitute an electric servo brake, and control distribution of braking forces caused by the four brake devices 51 and a braking force caused through regenerative braking of the motor M, for example.

The ECU 24A is a stop maintenance control unit configured to control an electric parking lock device 50a provided in the automatic transmission TM. The electric parking lock device 50a mainly includes a mechanism, such as a parking gear and a parking pole, configured to lock an internal mechanism of the automatic transmission TM when a P range (parking range) is selected. The ECU 24A can control locking and unlocking of the electric parking lock device 50a.

The ECU 25A is an in-vehicle notification control unit configured to control an information output device 43A that provides notifications of information to the inside of the vehicle. The information output device 43A is a display device, such as a head-up display, and a sound output device, such as a speaker, for example. The information output device 43A may further include a vibrator. The ECU 25A causes the information output device 43A to output various kinds of information such as a vehicle speed and an outside air temperature and information such as route guide, for example.

The ECU 26A is an outside-vehicle notification control unit configured to control an information output device 44A that provides notifications of information to the outside of the vehicle. In the case of the embodiment, the information output device 44A is a direction indicator (hazard lamp), and the ECU 26A can provide notifications regarding traveling directions of the vehicle V to the outside of the vehicle by controlling blinking of the information output device 44A serving as the direction indicator and can increase the attention to the vehicle V from the outside of the vehicle by controlling blinking of the information output device 44A serving as the hazard lamp.

The ECU 27A is a drive control unit configured to control the power plant 50. Although one ECU 27A is assigned to the power plant 50 in the embodiment, one ECU may be assigned to each of the internal combustion engine EG, the motor M, and the automatic transmission TM. The ECU 27A controls outputs from the internal combustion engine EG and the motor M and switches gears of the automatic transmission TM in response to an operation of the driver, a vehicle speed, and the like detected by an operation detection sensor 34a provided at an accelerator pedal AP and an operation detection sensor 34b provided at the brake pedal BP, for example. Note that a rotation speed sensor 39 configured to detect a rotation speed of an output shaft of the automatic transmission TM is provided at the automatic transmission TM as a sensor configured to detect a traveling state of the vehicle V. The vehicle speed of the vehicle V can be calculated from the detection result of the rotation speed sensor 39.

The ECU 28A is a position recognition unit configured to recognize a current position and a course of the vehicle V. The ECU 28A performs information processing on a result of control and detection or a result of communication of a gyro sensor 33A, a GPS sensor 28b, and a communication device 28c (receiver/transmitter) having an antenna. The gyro sensor 33A detects rotation motion of the vehicle V. The course of the vehicle V can be determined based on the detection result of the gyro sensor 33A and the like. The GPS sensor 28b detects a current position of the vehicle V. The communication device 28c performs wireless communication with a server that provides map information and traffic information and acquires such information. A database 28a can store highly accurate map information, and the ECU 28A can more accurately specify the position of the vehicle V on the lane based on the map information and the like.

An input device 45A is disposed in the vehicle to be operated by the driver and receives inputs of instructions and information from the driver.

[1-3. Control Device 1B]

A configuration of the control device 1B will be described with reference to FIG. 2. The control device 1B includes an ECU group (control unit group) 2B. The ECU group 2B includes a plurality of ECUs 21B to 26B. Each of the ECUs 21B to 26B includes a processor represented by a CPU, a storage device such as a semiconductor memory, an interface with an external device and the like. The storage device stores programs executed by the processor, data used in processing of the processor and the like. Each of the ECUs 21B to 26B may include a plurality of processors, a plurality of storage devices, a plurality of interfaces and the like. The number of ECUs in the ECU group 2B and the functions in charge of each of the ECUs may be appropriately changed, and may be subdivided or integrated more than those in the embodiment, for example. In FIG. 2, names of typical functions of the ECUs 21B to 26B are denoted similarly to the ECU group 2A.

The ECU 21B is an environment recognition unit configured to recognize a traveling environment of the vehicle V based on detection results of detection units 31B and 32B configured to detect a surrounding situation of the vehicle V and is also a traveling assistance unit configured to execute control related to traveling assistance (in other words, driving assistance) of the vehicle V. In the case of the embodiment, the detection unit 31B is a camera that captures an image in front of the vehicle V (hereinafter, may be referred to as a camera 31B) and is provided at a roof front part of the vehicle V. Through analysis of the image captured by the camera 31B, it is possible to extract outlines of targets and lane markers (white lines or the like) for lanes of roads. In the case of the embodiment, the detection unit 32B is a millimeter-wave radar (hereinafter, may be referred to as a radar 32B) and detects targets in the surroundings of the vehicle V and measures distances to the targets. In the case of the embodiment, five radars 32B are provided including one radar provided at the center of the front part of the vehicle V, two radars provided at corners of the front portion, and two radar provided at corners of the rear part.

As details of the traveling assistance, the ECU 21B can execute control such as collision reduction braking and lane deviation prevention, for example. The collision reduction braking instructs the ECU 23B to operate the brake devices 51 and assists avoidance of collision when the possibility of a collision with an obstacle in front increases. The lane deviation prevention instructs the ECU 22B to operate the electric power steering device 41B and assists the lane deviation when the vehicle V may deviate from the traveling lane.

The ECU 22B is a steering control unit configured to control the electric power steering device 41B. The electric power steering device 41B includes a mechanism configured to steer the front wheels in response to a driving operation (steering operation) performed by the driver on the steering wheel ST. The electric power steering device 41B includes a motor configured to assist the steering operation and exert a drive force for automatically steering the front wheels, a sensor configured to detect the amount of rotation of the motor, a torque sensor configured to detect a steering torque imparted on the driver and the like. Further, a steering angle sensor 37 is electrically connected to the ECU 22B, and the ECU 22B can control the electric power steering device 41B based on a detection result of the steering angle sensor 37. The ECU 22B can acquire a detection result of a monitoring sensor 36 configured to detect whether the driver holds the steering wheel ST and a detection result of a sensor (not shown) configured to detect whether the driver monitors the outside (for example, the front), and can monitor driver's state (holding state, line of sight and the like).

The ECU 23B is a braking control unit configured to control a hydraulic device 42B. A braking operation performed by the driver on the brake pedal BP is converted into a hydraulic pressure by the brake master cylinder BM and then the hydraulic pressure is delivered to the hydraulic device 42B. The hydraulic device 42B includes an actuator capable of controlling hydraulic pressures of hydraulic oil to be supplied to the brake devices 51 provided at the respective wheels based on the hydraulic pressure delivered from the brake master cylinder BM, and the ECU 23B performs drive control for an electromagnetic valve and the like provided in the hydraulic device 42B.

In the case of the embodiment, wheel speed sensors 38 provided respectively at the four wheels, a yaw rate sensor 33B, and a pressure sensor 35 configured to detect a pressure in the brake master cylinder BM are electrically connected to the ECU 23B and the hydraulic device 42B, and an ABS function, traction control, and a posture control function of the vehicle V are realized based on such detection results. For example, the ECU 23B adjusts braking forces of the respective wheels based on the detection result of the wheel speed sensors 38 provided at the four wheels and prevents slipping of the respective wheels. The ECU 23B adjusts the braking forces of the respective wheels based on a rotational angular speed of the vehicle V around a vertical axis detected by the yaw rate sensor 33B and prevents a steep change in posture of the vehicle V.

In addition, the ECU 23B also functions as an outside-vehicle notification control unit configured to control an information output device 43B that provides notifications of information to the outside of the vehicle. In the case of the embodiment, the information output device 43B is a brake lamp, and the ECU 23B can turn on the brake lamp at the time of braking. In this manner, it is possible to increase attention to the vehicle V from a following vehicle.

The ECU 24B is a stop maintenance control unit configured to control electric parking brake devices (drum brakes, for example) 52 provided at rear wheels. The electric parking brake devices 52 include mechanisms configured to lock the rear wheels. The ECU 24B can control locking and unlocking of the rear wheels performed by the electric parking brake devices 52.

The ECU 25B is an in-vehicle notification control unit configured to control an information output device 44B that provides notifications of information to the inside of the vehicle. In the case of the embodiment, the information output device 44B includes a display device, such as a head-up display, and a sound output device, such as a speaker, disposed in an instrument panel. The information output device 44B may further include a vibrator. The ECU 25B can cause the information output device 44B to output various kinds of information such as a vehicle speed and fuel efficiency, and can output various warnings.

The ECU 26B is a battery management unit configured to determine whether a state (discharge performance, temperature drop, charge amount in this configuration) of a battery 72B (see FIG. 3) of the vehicle V. The ECU 26B determines whether the discharge performance of the battery 72B is good when the vehicle V is started and prohibits the ECU 20A from executing automatic driving control when the discharge performance of the battery 72B is not good. Hereinafter, the ECU 26B will also be referred to as a battery management ECU 26B.

An input device 45B is disposed in the vehicle to be operated by the driver, and receives inputs of instructions and information from the driver.

[1-4. Communication Line]

A communication line in the vehicle V that communicably connect the ECUs will be described with reference to FIG. 3. The vehicle V includes wired communication lines L1 to L5. The respective ECUs 20A to 27A of the control device 1A are connected to the communication line L1. Note that the ECU 28A may also be connected to the communication line L1.

The respective ECUs 21B to 26B of the control device 1B are connected to the communication line L2. In addition, the ECU 20A of the control device 1A is also connected to the communication line L2. The communication line L3 connects the ECU 20A and the ECU 21A. The communication line L5 connects the ECU 20A, the ECU 21A, and the ECU 28A.

Although protocols of the communication lines L1 to L5 may be the same or different from each other, the protocols may differently be set depending on a communication environment such as the amount of communication and durability. For example, the communication lines L3 and L4 may be Ethernet (registered trademark) in terms of communication speeds. For example, the communication lines L1, L2, and L5 may be CAN.

The control device 1A includes a gateway GW. The gateway GW relays the communication line L1 and the communication line L2. Therefore, for example, the ECU 21B can output a control command to the ECU 27A via the communication line L2, the gateway GW, and the communication line L1.

[2-1. Redundancy]

Common functions of the control device 1A and the control device 1B will be described. It is possible to improve reliability of the vehicle V by making the same functions redundant. For some of the functions that have been made redundant, completely the same functions are not multiplexed, and different functions are exhibited. This prevents an increase in costs caused by making the functions redundant.

[2-2. Actuator System]

<Steering>

The control device 1A includes the electric power steering device 41A and the ECU 22A configured to control the electric power steering device 41A. The control device 1B also includes the electric power steering device 41B and the ECU 22B configured to control the electric power steering device 41B.

<Braking>

The control device 1A includes the hydraulic device 42A and the ECU 23A configured to control the hydraulic device 42A. The control device 1B includes the hydraulic device 42B and the ECU 23B configured to control the hydraulic device 42B. All of such components can be used for braking of the vehicle V. On the other hand, the braking mechanism of the control device 1A has a main function of distributing a braking force caused by the brake devices 51 and a braking force caused by regenerative braking of the motor M, whereas the braking mechanism of the control device 1B has a main function of controlling a posture. Both the braking mechanisms are common in terms of braking, but exhibit different functions.

<Stop Maintenance>

The control device 1A includes the electric parking lock device 50a and the ECU 24A configured to control the electric parking lock device 50a. The control device 1B includes the electric parking brake devices 52 and the ECU 24B configured to control the electric parking brake devices 52. All of such components can be used to maintain the stopping of the vehicle V. On the other hand, the electric parking lock device 50a is a device that functions when the P range of the automatic transmission TM is selected, whereas the electric parking brake devices 52 are adapted to lock the rear wheels. Both of the electric parking lock device 50a and the electric parking brake devices 52 are common in terms of stop maintenance of the vehicle V, but exhibit different functions.

<In-Vehicle Notification>

The control device 1A includes the information output device 43A and the ECU 25A configured to control the information output device 43A. The control device 1B includes the information output device 44B and the ECU 25B configured to control the information output device 44B. All of such components can be used to provide notifications of information to the driver. On the other hand, the information output devices 43A and 44B are common in terms of in-vehicle notification, and can employ different display devices. In the embodiment, the information output device 43A employs a head-up display, and the information output device 44B employs an instrument panel.

<Outside-Vehicle Notification>

The control device 1A includes the information output device 44A and the ECU 26A configured to control the information output device 44A. The control device 1B includes the information output device 43B and the ECU 23B configured to control the information output device 43B. All of such components can be used to provide notifications of information to the outside of the vehicle. On the other hand, the information output device 44A is a direction indicator (hazard lamp), and the information output device 43B is a brake lamp. Both of such components are common in terms of outside-vehicle notification, but perform different functions. Note that it is also possible to employ a configuration in which the control device 1B controls the hazard lamp while the control device 1A controls the brake lamp.

<Differences>

The control device 1A includes the ECU 27A configured to control the power plant 50, whereas the control device 1B does not include any ECU configured to control the power plant 50. In the case of the embodiment, both of the control devices 1A and 1B can independently perform steering, braking, and stop maintenance, and it is possible to reduce the speed and to maintain a stopping state while preventing departure from a lane even in a case in which either the control device 1A or the control device 1B experiences degradation of performance, disconnection from the power source, or disconnection of communication. It is possible to prevent an increase in costs by the control device 1B not being provided with any ECU configured to control the power plant 50.

[2-3. Sensor System]

<Detection of Surrounding Situation>

The control device 1A includes the detection units 31A and 32A. The control device 1B includes the detection units 31B and 32B. All of such components can be used to recognize a traveling environment of the vehicle V. On the other hand, the detection unit 32A is a lidar, and the detection unit 32B is a radar. The lidar is typically advantageous in detecting shapes. The radar is typically more advantageous than the lidar in terms of costs. By using these sensors with different properties together, it is possible to improve performance to recognize targets and to reduce costs. Although both the detection units 31A and 31B are cameras, cameras having different properties may be used. For example, one of the cameras may have a higher resolution than a resolution of the other camera. The cameras may have mutually different image angles.

<Vehicle Speed>

The control device 1A includes the rotation speed sensor 39. The control device 1B includes the wheel speed sensors 38. Both of such components can be used to detect the vehicle speed. On the other hand, the rotation speed sensor 39 is adapted to detect a rotation speed of the output shaft of the automatic transmission TM, and the wheel speed sensors 38 are adapted to detect a rotation speed of the wheels. Both of the sensors are common in that the vehicle speed can be detected, but are sensors whose detection targets are different from each other.

<Yaw Rate>

The control device 1A includes the gyro sensor 33A. The control device 1B includes the yaw rate sensor 33B. Both of such components can be used to detect an angular speed of the vehicle V around the vertical axis. On the other hand, the gyro sensor 33A is used to determine a course of the vehicle V, and the yaw rate sensor 33B is used for posture control of the vehicle V. Both of the sensors are common in that the angular speed of the vehicle V is detected, but are sensors having different purposes of utilization.

<Steering Angle and Steering Torque>

The control device 1A includes a sensor configured to detect a rotation amount of a motor of the electric power steering device 41A. The control device 1B can acquire a result of the detection performed by the steering angle sensor 37 without the gateway GW being interposed. Both of such components can be used to detect a steering angle of the front wheels. The control device 1A can prevent an increase in costs by using the sensor configured to detect the rotation amount of the motor of the electric power steering device 41A without additionally providing the steering angle sensor 37. It is a matter of course that the steering angle sensor 37 may additionally be provided at the control device 1A as well, and both or one of the sensor configured to detect the rotation amount of the motor and the steering angle sensor 37 may be made redundant in the electric power steering devices 41A and 41B.

Further, since both the electric power steering devices 41A and 41B include the torque sensor, both the control devices 1A and 1B can recognize a steering torque.

<Amount of Braking Operation>

The control device 1A includes the operation detection sensor 34b. The control device 1B includes the pressure sensor 35. All of such components can be used to detect the amount of braking operation performed by the driver. On the other hand, the operation detection sensor 34b is used to control distribution of braking forces caused by four brake devices 51 and a braking force caused by the regenerative braking of the motor M through, and the pressure sensor 35 is used for posture control and the like. Both of the sensors are common in that the amount of braking operation is detected, but are sensors having different purposes of utilization.

A power source system will be described below.

[3-1. Power Source]

A power source of the vehicle V including the vehicle control device 1 will be described with reference to FIG. 3. The vehicle control device 1 includes a large-capacity battery 6 used as a main battery, a power source 7A, and a power source 7B. The large-capacity battery 6 is a battery for driving the motor M and is also a battery that is charged by the motor M.

The power source 7A is a power source configured to supply power to the control device 1A and includes a power source circuit 71A and a battery 72A used as an auxiliary battery. The power source circuit 71A is a circuit configured to supply electric power from the large-capacity battery 6 to the control device 1A and lowers a voltage (190 V, for example) output from the large-capacity battery 6 to a reference voltage (12 V, for example), for example. The battery 72A is a lead battery of 12 V, for example. By providing the battery 72A, it is possible to supply the power to the control device 1A even when the power supply from the large-capacity battery 6 or the power source circuit 71A is cut off or reduced.

The power source 7B is a power source configured to supply power to the control device 1B and includes a power source circuit 71B and the battery 72B used as an auxiliary battery. The power source circuit 71B is a circuit that is similar to the power source circuit 71A and is a circuit configured to supply power from the large-capacity battery 6 to the control device 1B. The battery 72B is a battery that is similar to the battery 72A and is a lead battery of 12 V, for example. By providing the battery 72B, it is possible to supply power to the control device 1B even when power supply from the large-capacity battery 6 or the power source circuit 71B is cut off or reduced. The battery 72B corresponds to a battery provided in the vehicle V in order to execute the vehicle stop control according to the invention.

[3-2. Redundancy of Power Source]

The control device 1A operates using power supplied from the power source 7A, and the control device 1B operates using power supplied from the power source 7B. Since the power is supplied to either the control device 1A or the control device 1B even when the power supplied from either the power source 7A or the power source 7B is cut off or reduced, it is possible to more reliably secure the power source and thereby to improve reliability of the vehicle control device 1. When the power supplied from the power source 7A is cut off or reduced, it is difficult to perform communication between the ECUs via the gateway GW provided at the control device 1A. However, the ECU 21B in the control device 1B can communicate with the ECUs 22B to 25B via the communication line L2.

[4-1. Configuration of Auxiliary Battery to be Managed by Battery Management ECU]

A configuration of a battery 72B to be managed by the battery management ECU 26B will be described.

Figure 3:
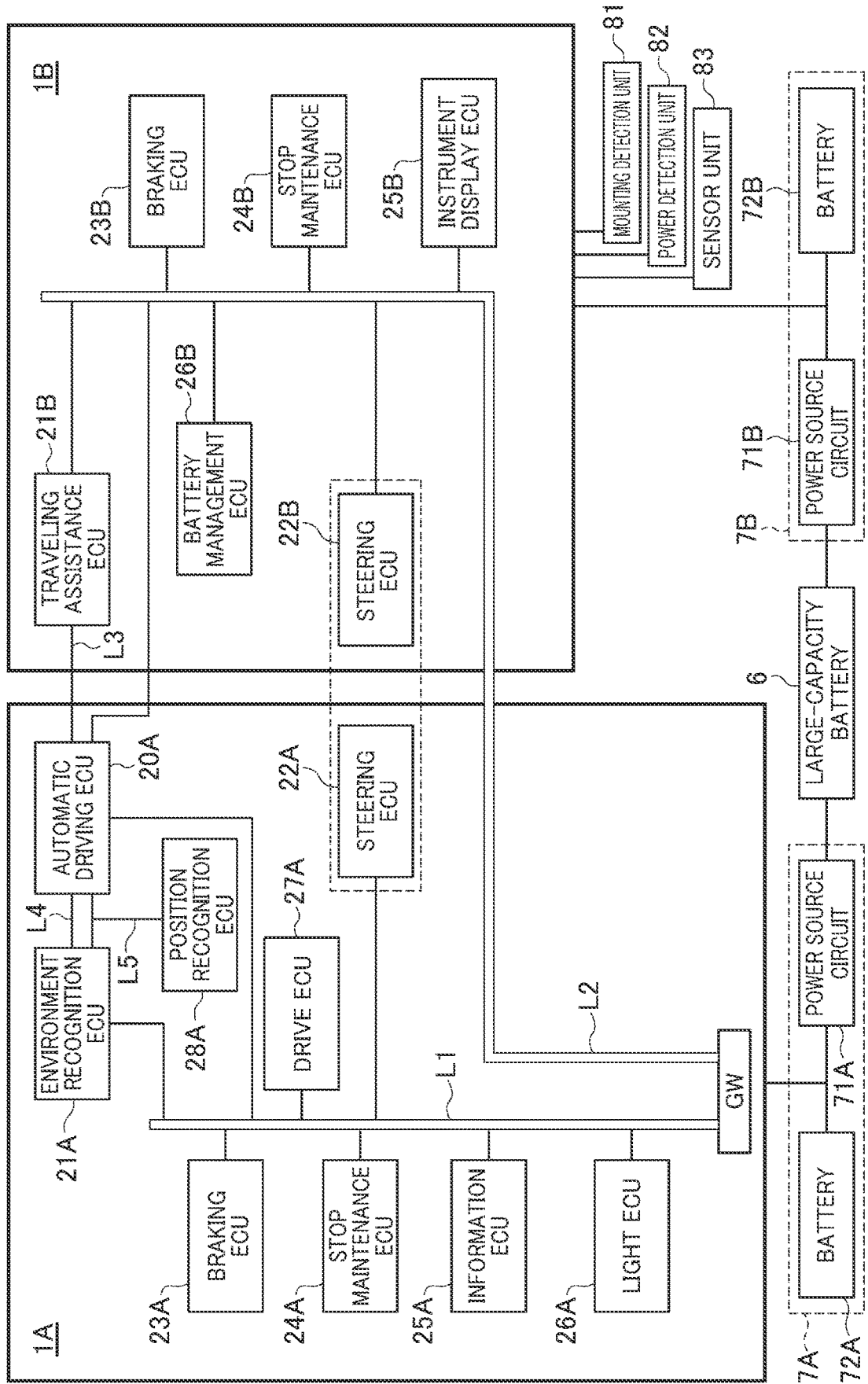
FIG. 3 is a control block diagram including a communication line of the vehicle control device.

As shown in FIG. 3, the vehicle V includes a mounting detection unit 81 that detects the mounting of the battery 72B, a power detection unit 82 that detects voltage and current values of the battery 72B, and a sensor unit 83 that detects a temperature of the battery 72B. Normally, the battery 72B is mounted during the battery replacement. The mounting detection unit 81 of the embodiment detects the mounting of the battery 72B as a replacement of the battery 72B.

The mounting detection unit 81 might include a sensor configured to detect replacement of the battery 72B by sensing change in internal resistance of the battery 72B. The power detection unit 82 includes a current sensor 200 (see FIG. 7 to be described below) configured to detect a discharge current and a charging current of the battery 72B and a voltage sensor 201 (see FIG. 7 to be described below) configured to detect the voltage between terminals of the battery 72B. In FIG. 3, the mounting detection unit 81 and the power detection unit 82 are provided outside the battery management ECU 26B, but may be provided inside the battery management ECU 26B.

Figure 4:
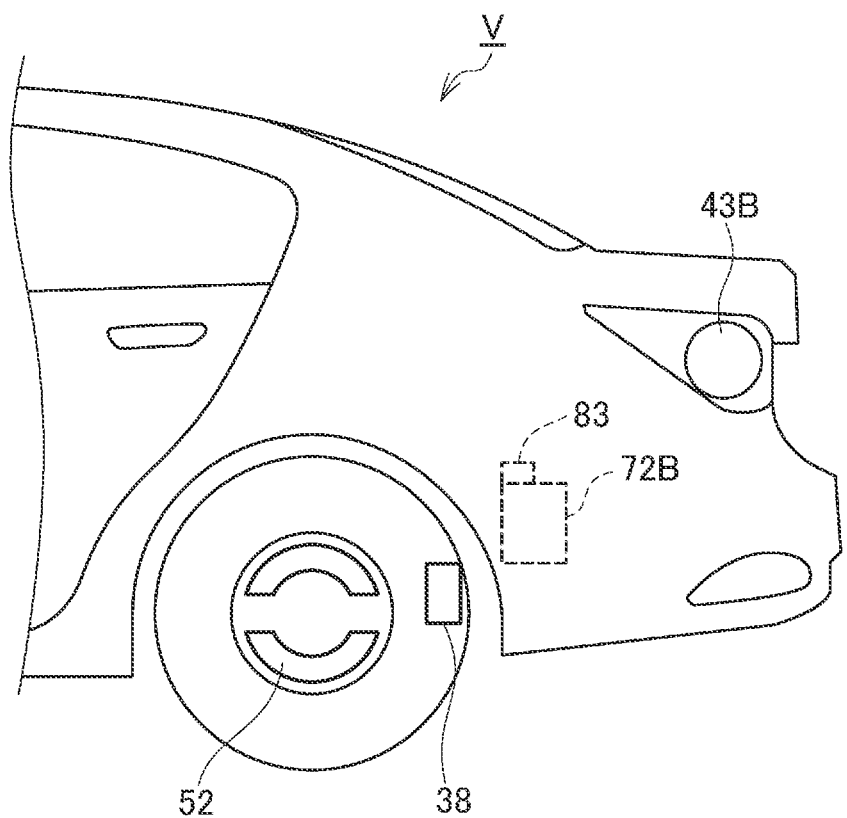
FIG. 4 is a view showing a rear part of a vehicle together with a battery.

FIG. 4 is a view showing a rear part of the vehicle V together with the battery 72B. As shown in FIG. 4, the battery 72B is provided in a trunk room of the vehicle V, and the sensor unit 83 is mounted on the battery 72B. The sensor unit 83 is removed during the replacement of the battery 72B, and is mounted on a new battery 72B.

The sensor unit 83 includes a temperature sensor configured to detect a temperature around the battery 72B (a temperature inside the trunk room in this configuration, and hereinafter referred to as an environment temperature T).

Since the temperature sensor configured to detect the environment temperature T is provided outside the battery 72B, the environment temperature T deviates from a temperature (referred to as a liquid temperature) of an electrolytic solution in the battery 72B. For this reason, the sensor unit 83 acquires a liquid temperature estimation value (hereinafter, referred to as a battery temperature estimation value T_BATT) using a predetermined estimation logic for estimating an estimation value of the liquid temperature from the environment temperature T.

The battery management ECU 26B monitors the acquired battery temperature estimation value T_BATT to determine whether the battery is in a low capacity state (corresponding to a degradation state of discharge performance) due to the temperature of the battery 72B. Thus, when an output voltage of the battery 72B drops due to a drop in temperature up to a state where generated power of the generator can hardly be supplemented, the battery management ECU 26B determines that the battery is in a low capacity state. When determining that the battery is in the low capacity state, the battery management ECU 26B restricts the automatic driving. The generator is the motor M in the embodiment, but may be an alternator.

[4-2. Estimation Logic of Battery Temperature Estimation Value]

An estimation logic of the battery temperature estimation value T_BATT will be described.

When a temperature difference between the environment temperature T and the battery temperature estimation value T_BATT is defined as $\Delta T$, the amount of heat Q transferred into the battery 72B is proportional to the temperature difference $\Delta T$, so that a relation of $Q = \Delta T \times K$ is satisfied. The value K is a coefficient determined by a material or a shape of each part of the battery 72B. A value of a temperature change in the battery 72B can be expressed by $\Delta T\_BATT = Q/\text{battery heat capacity}$.

From the above, the battery temperature estimation value T_BATT can be calculated by Equation (1) to be described below.

$$T\_BATT = T\_BATT(\text{previous value}) + \Delta T\_BATT \quad (1)$$
$$= T\_BATT(\text{previous value}) + \Delta T \times K / \text{battery heat capacity}$$

As described above, the battery temperature estimation value T_BATT is a value obtained using the past estimation value, and is also a value obtained by a learning process.

By the way, when the battery 72B is newly mounted, learning information such as the previous battery temperature estimation value T_BATT is reset. Therefore, information accuracy deteriorates when the battery 72B is mounted, and an error of the battery temperature estimation value T_BATT becomes large for a while. Instead of the method of resetting the learning information when the battery 72B is mounted, the learning information may be reset when the battery 72B is removed. In this case, information accuracy deteriorates when the battery 72B is removed, and an error of the battery temperature estimation value T_BATT becomes large for a while.

The estimation logic of the battery temperature estimation value T_BATT may not be limited to Equation (1) described above. At least when the estimation logic uses the past estimation value or performs the learning process, the past estimation value and the like is reset when the battery is replaced, and thus the accuracy of the battery temperature estimation value T_BATT becomes low.

[4-3. Battery Temperature Estimation Value after Replacement of Battery]

Figure 5:
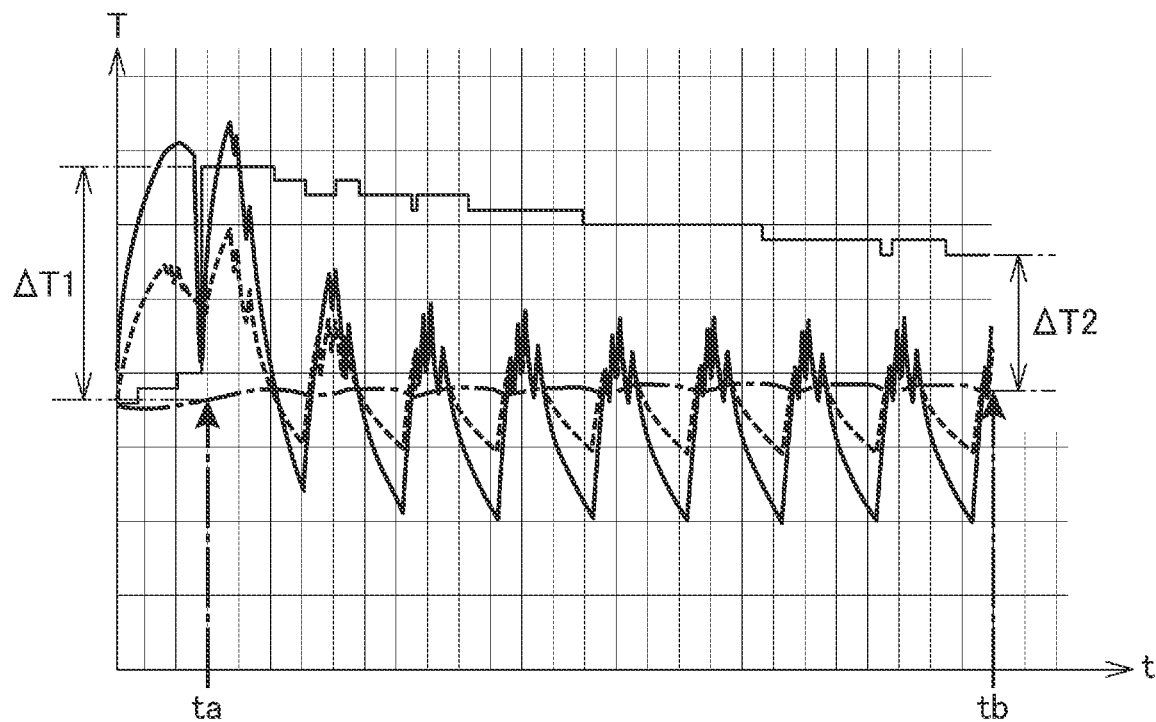
FIG. 5 is a view showing an example of a temperature of each of parts after replacement of a battery.

FIG. 5 is a view showing an example of a temperature of each of parts after replacement of the battery 72B. When the battery 72B is replaced in a case of an environment temperature TK as shown in FIG. 5, the battery temperature estimation value T_BATT is reset at a battery replacement timing ta, so that a temperature difference $\Delta T1$ between the battery temperature estimation value T_BATT and an actual battery temperature T_BB becomes large.

Moreover, since a next battery temperature estimation value T_BATT is estimated using the previous battery temperature estimation value T_BATT, the temperature difference $\Delta T1$ becomes continually large, and a temperature difference $\Delta T2$ between the battery temperature estimation value T_BATT and the actual battery temperature T_BB has a relatively large value even at a predetermined timing tb shown in FIG. 5.

Therefore, during the period from the timing to the timing tb shown in FIG. 5, at least the error of the battery temperature estimation value T_BATT becomes continually large.

Figure 6:
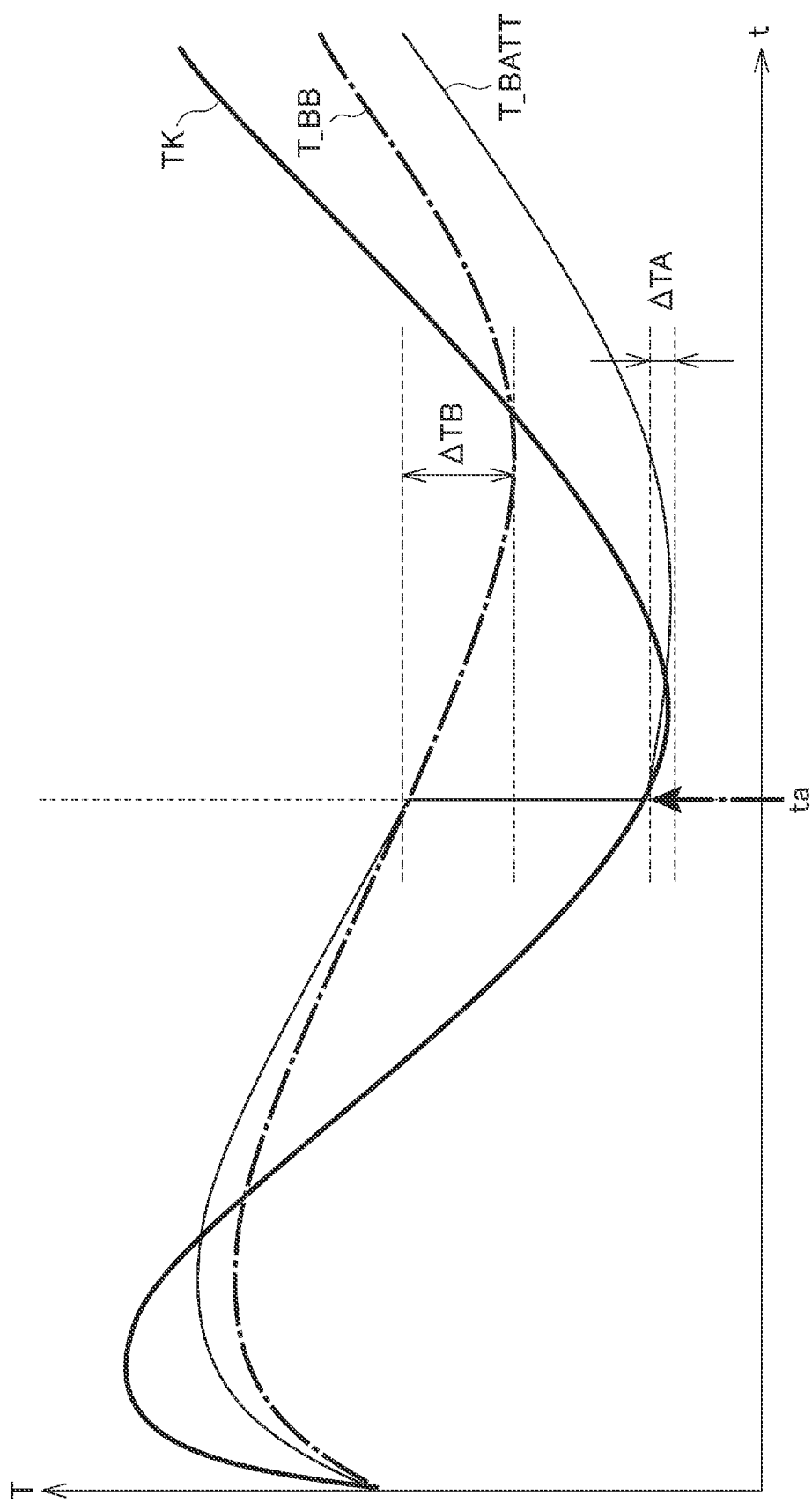
FIG. 6 is a view showing a temperature of each of parts after replacement of a battery in a situation of change from a predetermined high-temperature environment to a low-temperature environment.

FIG. 6 is a view showing a temperature of each of parts after replacement of the battery in a situation of change from a predetermined high-temperature environment to a low-temperature environment. For example, a case where the vehicle V is driven in a maximum cooling state with an air conditioner from a state being left outdoors in the summer or where the vehicle V moves to an extremely cold outdoor area from an indoor garage in a relatively high-temperature environment is considered to be the change from the high-temperature environment to the low-temperature environment.

In this case, as shown in FIG. 6, a drop width in temperature $\Delta TA$ of the battery temperature estimation value T_BATT is smaller than a drop width in temperature $\Delta TB$ of the actual battery temperature T_BB. For this reason, even when the output voltage of the battery 72B drops due to the drop in temperature of the drop width in temperature $\Delta TB$ up to the state where the generated power of the generator can hardly be supplemented, the battery may not be determined, from the drop width in temperature $\Delta TA$ of the battery temperature estimation value T_BATT, to be in a low capacity state.

Therefore, according to the configuration described above, the battery management ECU 26B determines the state of the battery 72B without using the battery temperature estimation value T_BATT in a battery state determination process to be described below until a predetermined time tY or more to be described below elapses from a time when the mounting detection unit 81 detects the replacement of the battery 72B, and restricts the automatic driving according to the determination result.

[4-4. Configuration of Battery Management ECU]

A configuration of the battery management ECU 26B will be described with reference to FIG. 7.

The battery management ECU 26B is an electronic circuit unit including a CPU 100 and a memory 110. The memory 110 stores a control program 111 of the battery management ECU 26B and various kinds of value data 112 in which various values are described.

The CPU 100 reads and executes the control program 111 stored in the memory 110 and functions as an information acquisition unit 101, a discharge performance determination unit 102 (corresponding to a first determination unit), a temperature determination unit 103 (corresponding to a second determination unit), a charge amount determination unit 104 (corresponding to a third determination unit), an automatic driving executability determination unit 105 (corresponding to a control unit of the embodiment), a first elapsed time measurement unit 106, and a second elapsed time measurement unit 107.

The information acquisition unit 101 acquires battery information (battery temperature estimation value T_BATT, voltage Vs of the battery 72B, current value Is, and presence or absence of mounting of the battery 72B) detected by the power detection unit 82, the sensor unit 83, and the mounting detection unit 81.

The discharge performance determination unit 102 controls a discharge circuit 202 configured to discharge the battery 72B, thereby performing a discharge test (also referred to as a battery performance test) in which the battery 72B is actually caused to discharge and determining whether the battery 72B is capable of discharging the predetermined amount of current based on the information (voltage Vs and current value Is) acquired by the information acquisition unit 101. The discharge performance determination unit 102 determines that the battery 72B is in a low capacity state when confirming that the battery 72B cannot discharge the predetermined amount of current.

Here, the predetermined amount of current is set to an amount of current required to execute a driving stop control.

In this way, the discharge performance determination unit 102 functions as a first determination unit that determines whether the battery is in a low capacity state due to the actual output of the battery 72B. When it is confirmed by the discharge test that the battery 72B can discharge the predetermined amount of current, the automatic driving executability determination unit 105 preferably charges the battery 72B up to the target SOC using the power source circuit 71B (charging for recovery).

The temperature determination unit 103 acquires the battery temperature estimation value T_BATT, which is detected by the sensor unit 83, via the information acquisition unit 101, and confirms whether the amount of change in the battery temperature estimation value T_BATT is a drop by a preset specified temperature $\Delta TX$ or more. When the temperature determination unit 103 confirms that the temperature lowers by the specified temperature $\Delta TX$ or more, it is determined that the battery 72B is in a low capacity state.

Figure 8:
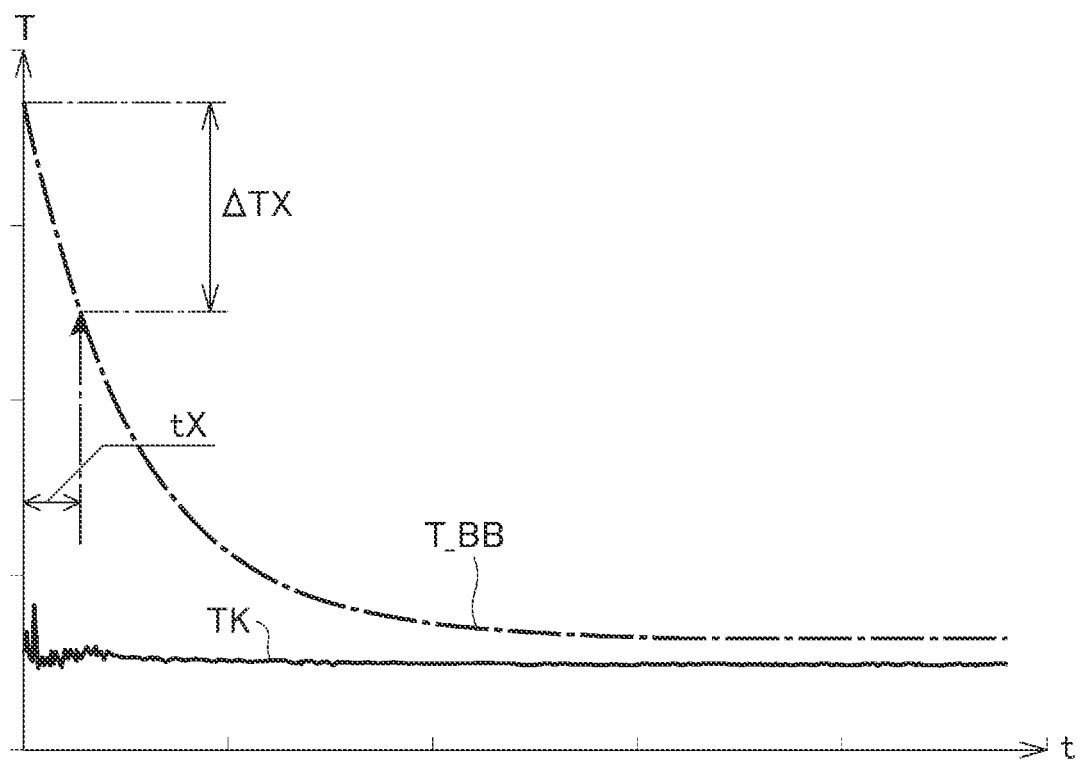
FIG. 8 is a view used for explaining a specified temperature $\Delta TX1$ and a specified time tX.

Here, the specified temperature $\Delta TX$ is set to a threshold value at which it can be determined that the output voltage of the battery 72B drops to a state where the generated power of the generator cannot be supplemented. In the embodiment, as shown in FIG. 8, the specified temperature ΔTX is set to a value at which it can be determined from the actual temperature change characteristics (characteristic curve indicated by T_BB in FIG. 8) of the battery 72B that the battery 72B is in a low capacity state due to the drop in temperature. The specified time tX at which a drop by the specified temperature ΔTX or larger occurs is used as a cycle for retrying the discharge test (referred to as a retry cycle).

As described above, the temperature determination unit 103 functions as a second determination unit that determines whether the battery is in a low capacity state due to the temperature of the battery 72B.

The charge amount determination unit 104 acquires a state of charge (SOC) of the battery 72B, and determines that the battery 72B is in a low capacity state when the SOC is less than a preset charge amount threshold value.

Here, the charge amount threshold value is set to an amount of charge required to continue the automatic driving of a second control state (hands-off) or higher, which will be described below. Thus, the charge amount determination unit 104 functions as a third determination unit that determines whether the battery is in a low capacity state due to the amount of charge of the battery 72B. As a method of measuring the SOC, for example, a known method including methods of estimating SOC by a current integration/recursive least square (RLS) method can be widely applied.

The automatic driving executability determination unit 105 allows the automatic driving ECU 20A to permit the automatic driving or restrict the automatic driving, based on the determination results of the discharge performance determination unit 102, the temperature determination unit 103, and the charge amount determination unit 104. The information used when the automatic driving executability determination unit 105 permits the automatic driving or restricts the automatic driving may not be limited to the determination results of the discharge performance determination unit 102, the temperature determination unit 103, and the charge amount determination unit 104. In other words, using at least one information of the discharge performance of the battery 72B, the battery temperature estimation value T_BATT, and the SOC of the battery 72B, the automatic driving executability determination unit 105 may permit the automatic driving or restrict the automatic driving. Using information other than the discharge performance of the battery 72B, the battery temperature estimation value T_BATT, and the SOC of the battery 72B, the automatic driving executability determination unit 105 may permit the automatic driving or restrict the automatic driving.

The first elapsed time measurement unit 106 measures a specified time tX shown in FIG. 8. More specifically, the first elapsed time measurement unit 106 measures whether the specified time tX has elapsed from the previous discharge test.

The second elapsed time measurement unit 107 measures a predetermined time tY that is a time during which the difference ΔT1 between the battery temperature estimation value T_BATT (estimation value) and the actual battery temperature T_BB (measured value) falls within an allowable range after the battery 72B is replaced. In the embodiment, it is possible to measure whether the predetermined time tY has elapsed after the mounting detection unit 81 detects the replacement of the battery 72B and the automatic driving executability determination unit 105 permits the automatic driving, and thus to measure whether the predetermined time tY or more has elapsed from the battery replacement timing.

The second elapsed time measurement unit 107 may be configured to measure whether the predetermined time tY has elapsed from the battery replacement timing detected by the mounting detection unit 81.

[4-5. Specified Time tX (Retry Cycle)]

Figure 9:
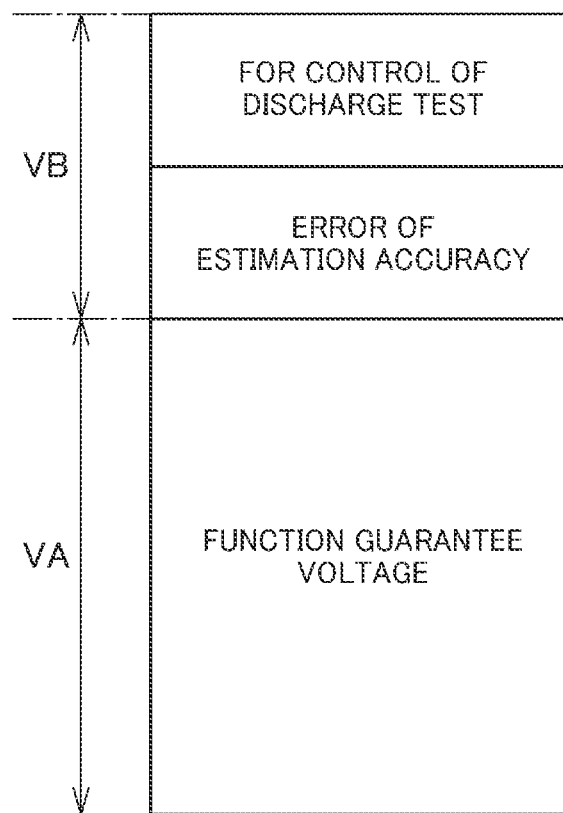
FIG. 9 is a view used for explaining a margin voltage VB.

As shown in FIG. 9, a margin voltage VB is set with respect to a function guarantee voltage VA that can guarantee the function of the automatic driving control using the battery 72B, and the shortest time is specified for which the voltage drops by the margin voltage VB as the temperature drops corresponding to the specified temperature ΔTX shown in FIG. 6.

Then, a time shorter than the shortest time is set to the specified time tX. Thus, after the confirmation from the discharge test that the battery 72B has sufficient output performance, the discharge test is retried at the timing when the specified time tX has elapsed, so that the discharge test can be retried before the voltage becomes less than the function guarantee voltage VA.

In the embodiment, the margin voltage VB includes a voltage sufficient to perform a next discharge test while securing the function guarantee voltage VA and a voltage sufficient to absorb the error of the battery temperature estimation value T_BATT. The margin voltage VB is preferably set to a voltage that secures a predetermined safety factor while considering actual temperature change characteristics of the battery 72B. However, the margin voltage VB can be changed to an appropriate value within a range in which the function of the vehicle V can be guaranteed after the lapse of the specified time tX.

[4-6. Predetermined Time tY]

As described above, the predetermined time tY is the time during which the difference ΔT2 between the battery temperature estimation value T_BATT and the actual battery temperature T_BB falls within the allowable range after the battery 72B is replaced. In the embodiment, an actual machine test is performed under a temperature condition of a worst case where the predetermined time tY is longest, and a time corresponding to the worst case is set to the predetermined time tY. The predetermined time tY is longer than the specified time tX, and is three times or more the specified time tX in the embodiment. Thus, the discharge test can be performed several times within the predetermined time tY.

[5-1. Transition of Automatic Driving Control State]

Figure 10:
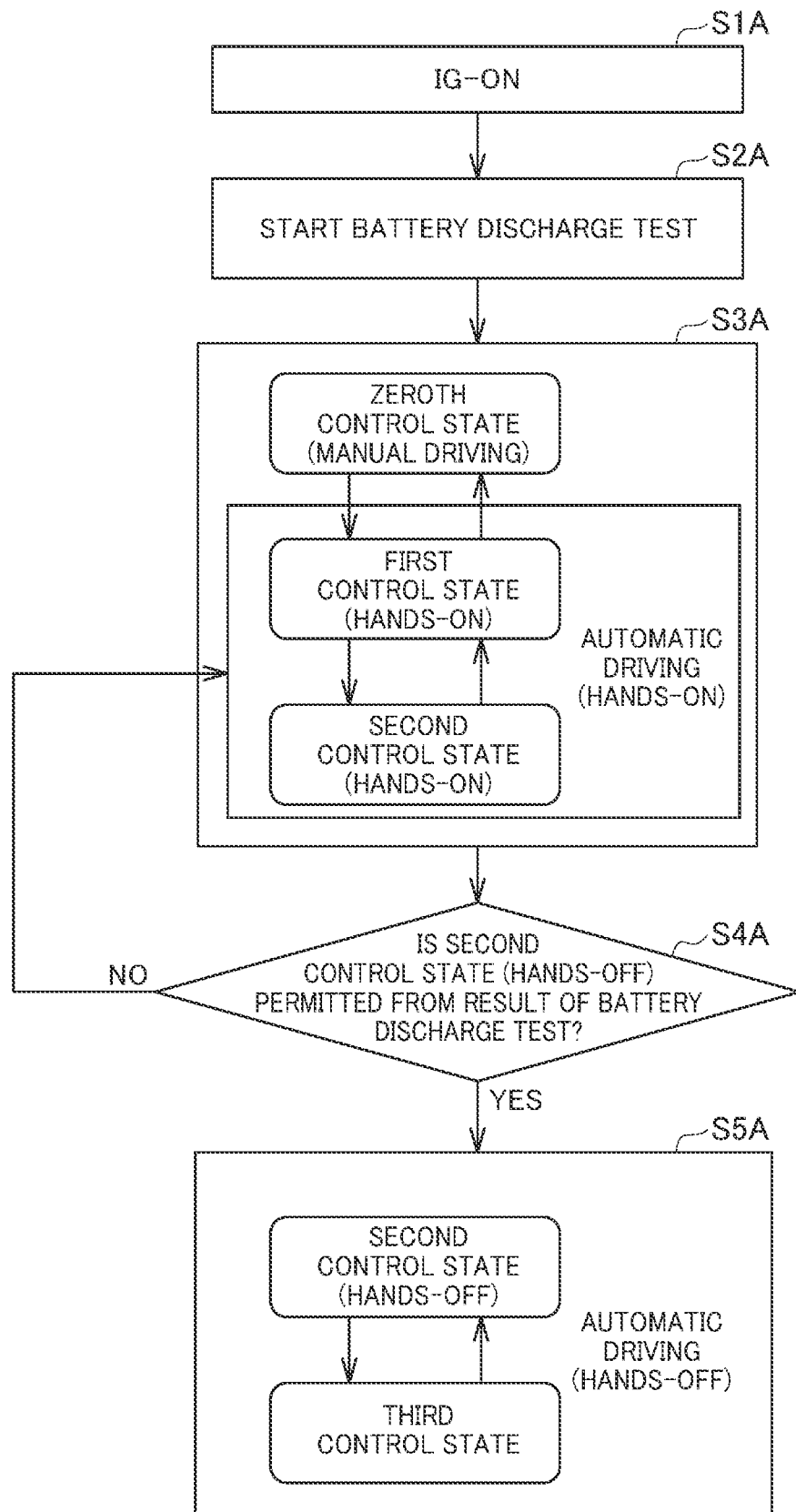
FIG. 10 is a flowchart showing a transition of an automatic driving control state.

A transition of the automatic driving control state will be described with reference to FIG. 10.

When the automatic driving executability determination unit 105 detects a start operation (an ignition On operation by the driver, or the like) of the vehicle V in step S1A, the process proceeds to step S2A. In step S2A, the automatic driving executability determination unit 105 starts the discharge test (also referred to as a battery performance test) of the battery 72B, and performs a process of step S3A. In step S3A, the automatic driving executability determination unit 105 permits automatic driving from a zeroth control state to a second control state (hands-on), which will be described below.

The automatic driving control state of the embodiment includes a zeroth control state to a third control state, and an automation rate increases in this order. In the zeroth control state that is a level of manual driving, driving assistance functions of LKAS (lane keeping assist function) and ACC (adaptive cruise control function) can be used, but the automatic driving control state does not change unless switching to the automatic driving is explicitly commanded by the driver.

When the driver explicitly commands the automatic driving by, for example, a switch operation in the zeroth control state, the automatic driving control state transitions to the first control state or the second control state according to an external environment and vehicle information at that time. The transition to any control state is determined with reference to external environment information and running state information by the automatic driving ECU 20A.

The first control state is the lowest level of the automatic driving control state in the automatic driving. When the automatic driving is commanded, the automatic driving is started in the first control state in a case where a current location cannot be recognized or in an environment (for example, a general road) where the second control state cannot be applied even when the current location can be recognized. The automation functions realized in the first control state include LKAS and ACC. In the first control state, the driver needs to monitor the outside and hold the steering wheel ST (which is called hands-on). For this reason, in the first control state, it is monitored whether the driver monitors the outside with the monitoring sensor 36 and the like and holds the steering wheel ST, and the information output device 44B outputs a warning when such driver's actions are not performed.

The second control state is a level of automatic driving control state higher immediately than the first control state. The second control state includes a state in which hands-on (holding of the steering wheel ST) is required (hereinafter, referred to as "second control state (hands-on)" and a state in which hands-on is not required (hereinafter, referred to as "second control state (hands-off)".

For example, when a command on the automatic driving is received in the zeroth control state and an external environment at that time is a predetermined environment (for example, during running on a highway), the automatic driving ECU 20A transitions to the second control state (hands-on). In the second control state (hands-on), a function of changing lanes according to targets such as surrounding vehicles is also provided in addition to the lane keeping function.

When the condition for maintaining the second control state (hands-on) is lost, the automatic driving ECU 20A changes an automation level of the vehicle V to the first control state. In the second control state (hands-on), it is monitored whether the driver monitors the outside with the monitoring sensor 36 and the like and holds the steering wheel ST, and the information output device 44B outputs a warning when such driver's actions are not performed.

When the result of the discharge test in step S2A is obtained, the automatic driving executability determination unit 105 performs a process of step S4A. In step S4A, the automatic driving executability determination unit 105 permits the second control state (hands-off) and performs a process of step S5A when it is confirmed by the discharge test that a predetermined amount of current is dischargeable. On the other hand, when it is determined by the discharge test that a predetermined amount of current is not dischargeable, the automatic driving executability determination unit 105 does not permit the second control state (hands-off).

The second control state (hands-off) includes a lane keeping function in a state of releasing the steering wheel ST. When the second control state (hands-off) is permitted, the automatic driving ECU 20A transitions to the second control state (hands-off) in a state where the driver releases the steering wheel ST or in an external environment (for example, highway) or a vehicle state (for example, vehicle speed) to which the second control state (hands-off) can be applied. In the second control state (hands-off), the driver is only required to monitor the surroundings. For this reason, the monitoring sensor 36 and the like monitors whether the driver monitors the outside, and the information output device 44B outputs a warning when the driver does not monitor the outside.

The third control state is a level of automatic driving control state higher immediately than the second control state. A transition to the third control state from the second control state can be performed, and a transition from the zeroth control state or the first control state is not performed by skipping of the second control state. In addition, the transition to the third control state is not performed by the driver's command as a trigger, but is performed when it is determined that a certain condition is satisfied by the automatic control of the automatic driving ECU 20A.

For example, during automatic driving in the second control state (hands-off), when a vehicle tracks a vehicle in front at a low speed due to a traffic jam, the second control state (hands-off) is switched to the third control state. The determination in this case is performed based on external environments and vehicle information. When the condition of the second control state (hands-off) is satisfied, for example, during driving on a highway, the automatic driving control state transitions between the second control state and the third control state. In the third control state, the driver does not need to hold the steering wheel ST and to monitor the surroundings, so that it is not necessary to monitor the driver's state while staying in the third control state.

In step S4A described above, the automatic driving executability determination unit 105 performs a battery state determination process of determining the state of the battery 72B, and also restricts automatic driving according to the determination result in the battery state determination process.

[5-2. Battery State Determination Process]

The battery state determination process to be executed by the battery management ECU 26B will be described with reference to FIG. 11.

The automatic driving executability determination unit 105 determines in step S1B whether a predetermined time tY has elapsed from the replacement of the battery 72B. In the embodiment, the second elapsed time measurement unit 107 detects whether the predetermined time tY has elapsed from the time of mounting the battery 72B detected by the mounting detection unit 81, so that the automatic driving executability determination unit 105 determines whether the predetermined time tY has elapsed from the replacement of the battery 72B.

A method of determining whether the predetermined time tY has elapsed from the replacement of the battery 72B is not limited thereto. For example, it may be determined whether the predetermined time tY has elapsed from the replacement of the battery 72B by detecting whether the elapsed time from the time when the automatic driving is permitted reaches a predetermined time or detecting whether a predetermined time has elapsed from the time when the second control state (hands-off) is permitted.

Figure 11:
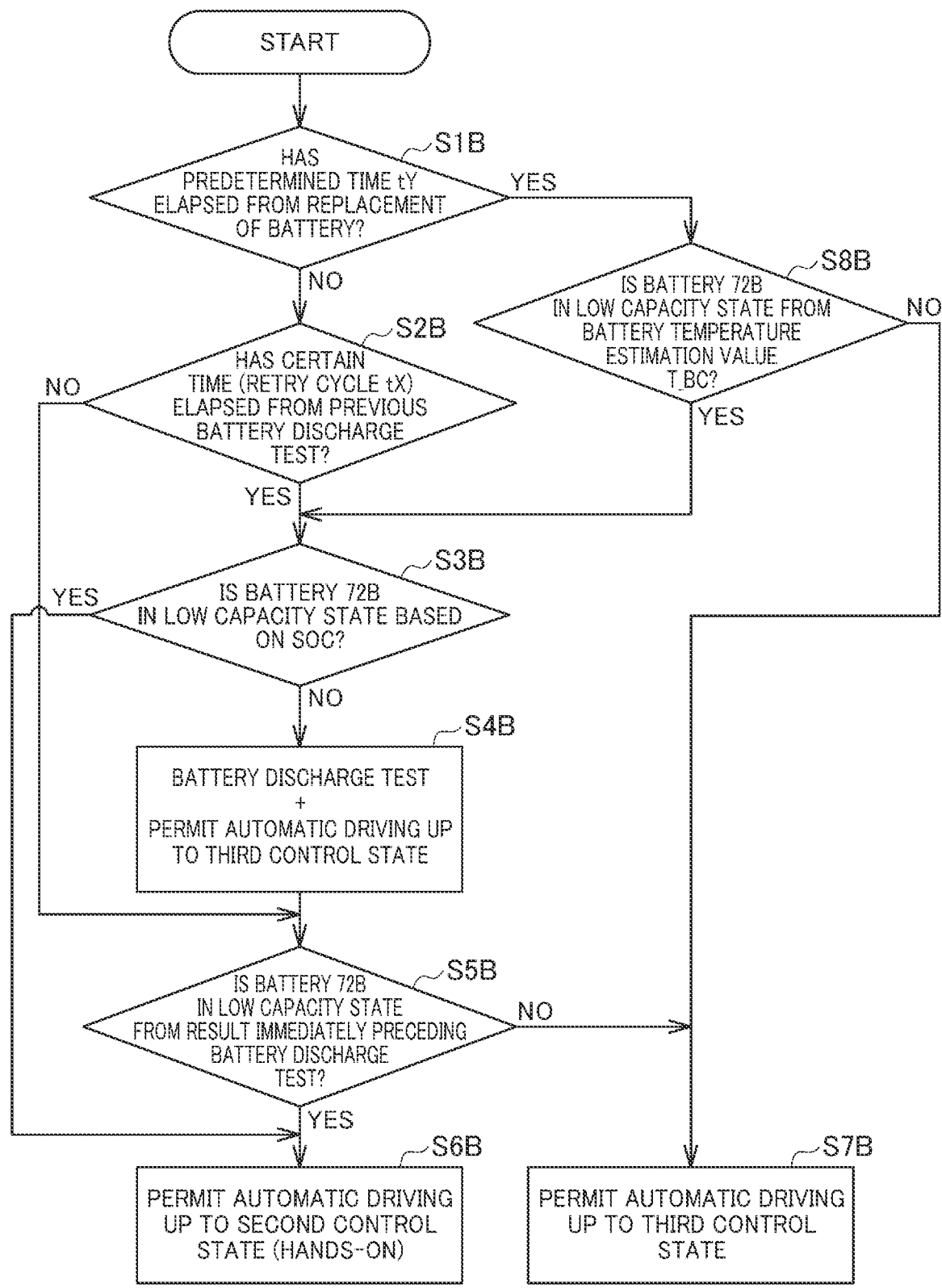
FIG. 11 is a flowchart of a battery state determination process.

In the embodiment, a flowchart shown in FIG. 11 starts after the second control state (hands-off) is permitted, but is not limited thereto. For example, the flowchart may start before the second control state (hands-off) is permitted, for example. Further, even after the process proceeds to step S7B to be described below, the determination starting from step S1B is performed continuously or at predetermined intervals, and when it is determined that the battery 72B does not have sufficient performance to execute hands-off, the transition to hands-on is performed.

When the predetermined time tY has not elapsed from the replacement of the battery 72B (NO in step S1B), the automatic driving executability determination unit 105 performs a process of step S2B. In step S2B, the automatic driving executability determination unit 105 determines whether a certain time (corresponding to a retry cycle tX) has elapsed from the previous battery discharge test, and performs a process of step S5B when a certain time has not elapsed from the previous battery discharge test (NO in step S2B). The predetermined time tY is measured by the first elapsed time measurement unit 106.

When a certain time (retry cycle tX) has elapsed from the previous battery discharge test (YES in step S2B), the automatic driving executability determination unit 105 performs a process of step S3B. In step S3B, the automatic driving executability determination unit 105 determines based on the SOC of the battery 72B by the charge amount determination unit 104 whether the battery is in a low capacity state. When it is determined that the battery is in a low capacity state (YES in step S3B), the automatic driving executability determination unit 105 performs a process of step S6B.

On the other hand, when it is determined based on the SOC of the battery 72B that the battery is not in a low capacity state (NO in step S3B), the automatic driving executability determination unit 105 performs a process of step S4B. In step S4B, the automatic driving executability determination unit 105 performs a discharge test of the battery 72B and permits automatic driving up to the third control state.

Since the discharge test is performed, the discharge performance determination unit 102 can determine with high accuracy based on the actual output of the battery 72B whether the battery is in a low capacity state. In addition, even when the retry cycle tX elapses, the automatic driving up to the third control state is permitted until the result of the discharge test is obtained, and thus it is possible to reduce the number of cases where the automatic driving with an unnecessarily high automation rate is restricted after the battery is replaced. Further, since the discharge test is performed only when it is determined based on the SOC that the battery is not in a low capacity state, it is possible to avoid the situation where the discharge test is performed in a state where the battery charge amount is small.

When the result of the discharge test is obtained, the automatic driving executability determination unit 105 performs a process of step S5B. In step S5B, when it cannot be confirmed from the result of the immediately preceding discharge test that a predetermined amount of current can be discharged, the automatic driving executability determination unit 105 determines that the battery is in a low capacity state (YES in step S5B), and performs a process of step S6B.

In step S6B, the automatic driving executability determination unit 105 permits automatic driving from the zeroth control state to the second control state (hands-on). Accordingly, the automatic driving ECU 20A controls the automatic driving from the zeroth control state to the second control state (hands-on).

As described above, even when it is determined based on the SOC that the battery is not in the low capacity state, the process proceeds to step S6B when it is determined by the discharge test that the battery is in the low capacity state. Since the automatic driving is restricted from the zeroth control state to the second control state (hands-on), the automatic driving can be appropriately restricted according to the actual output of the battery 72B.

When it is determined by the discharge test that the battery is not in the low capacity state (NO in step S5B), the automatic driving executability determination unit 105 performs a process of step S7B. In step S7B, the automatic driving executability determination unit 105 permits automatic driving from the zeroth control state to the third control state. Accordingly, the automatic driving ECU 20A transitions to the zeroth to third control states in response to any of the driver's command, the external environment, and the vehicle information. When it is determined in step S3B that the battery is in the low capacity state and the process proceeds to step S6B, the discharge test of the battery 72B may be performed thereafter.

Both the transition from the second control state (hands-off) to the third control state and the transition from the third control state to the second control state (hands-off) are performed after the respective processes including step S1B in FIG. 11 are performed.

Therefore, when the predetermined time tY has not elapsed from the replacement of the battery 72B, for example, the transition from the third control state to the second state (hands-off) is performed when it is determined that the battery is in the low capacity state, from either the SOC or the discharge test by a series of processes (first process) shown in steps S3B to S6B under the condition that the retry cycle tX has elapsed from the previous battery discharge test, and the transition from the second control state (hands-off) to the third state is performed when it is determined that the battery is not in the low capacity state, from the SOC and the discharge test by a series of processes (second process) shown in steps S3B to S7B under the condition that the retry cycle tX has elapsed from the previous battery discharge test.

As described above, even when the predetermined time tY has not elapsed from the replacement of the battery 72B, the restriction of the automatic driving to the second control state (hands-off) and the third control state can be canceled. In addition, when both the charge amount determination unit 104 and the discharge performance determination unit 102 determine that the battery is in the low capacity state, since the restriction of the automatic driving to the second control state (hands-off) and the third control state can be canceled, the restriction of the automatic driving can be canceled according to the actual output of the battery 72B.

In addition, when the predetermined time tY has elapsed from the replacement of the battery 72B (YES in step S1B), the automatic driving executability determination unit 105 performs a process of step S8B. In step S8B, the automatic driving executability determination unit 105 determines based on the battery temperature estimation value T_BATT by the temperature determination unit 103 whether the battery is in the low capacity state. When it is determined that the battery is not in the low capacity state (NO in step S8B), the automatic driving executability determination unit 105 performs a process of step S7B and permits the automatic driving from the zeroth control state to the third control state.

On the other hand, when it is determined based on the battery temperature estimation value T_BATT that the battery is in the low capacity state (YES in step S8B), the automatic driving executability determination unit 105 performs the process of step S3B. Thus, the first process shown in steps S3B to S6B (the process of restricting the automatic driving from the zeroth control state to the second control state (hands-on) when it is determined from either the SOC or the discharge test that the battery is in the low capacity state) is performed, or the second process shown in steps S3B to S7B (the process of permitting the automatic driving from the zeroth control state to the third control state when it is determined from the SOC and the discharge test that the battery is not in the low capacity state) is performed.

Therefore, even when it is determined that the battery is in the low capacity state due to the temperature of the battery 72B, it is possible to permit or restrict the automatic driving according to the actual output of the battery 72B using the result obtained by the battery discharge test.

In step S3B, the charge amount threshold value for determining based on the SOC whether the battery is in the low capacity state is a threshold value of SOC that can secure the amount of charge required to continue the automatic driving of the second control state (hands-off) or higher even after the battery discharge test is performed (even after the SOC of the discharge test is lowered by the battery discharge test). The amount of charge required to continue the automatic driving also includes a capacity by which an operation of a remaining automatic driving-related equipment can be maintained when the vehicle is evacuated to a safe evacuation site such as a road shoulder using the remaining automatic driving-related equipment in a case where the automatic driving is difficult to continue due to malfunction of automatic driving-related equipment.

As described above, the vehicle control device 1 of the embodiment includes the information acquisition unit 101, the discharge performance determination unit 102, and the charge amount determination unit 104 that function as the information acquisition units that acquire the battery temperature estimation value T_BATT, the discharge performance of the battery 72B, and the battery charge amount as battery information indicating the state of the battery 72B, and further includes the automatic driving executability determination unit 105 that permits and restricts the automatic driving.

When the replacement of the battery 72B is detected, the automatic driving executability determination unit 105 determines, using the battery information (battery charge amount and discharge performance) excluding the battery temperature estimation value T_BATT until the predetermined time tY elapses, whether the battery 72B is in the low capacity state, and restricts the automatic driving according to the determination result. Thereby, it is possible to prevent the situation where the automatic driving is restricted based on the battery temperature estimation value T_BATT when the error is large due to the replacement of the battery, and to enable the automatic driving, thereby the convenience of the user of the vehicle V can be improved.

In addition, the predetermined time tY is set to a time during which the discrepancy between the battery temperature estimation value T_BATT and the actual battery temperature T_BB (corresponding to the measured value) falls within an allowable range. According to such a configuration, it is possible to avoid a situation where the battery state is erroneously determined using the estimation value whose discrepancy from the measured value is out of the allowable range, until the predetermined time tY elapses.

The battery temperature estimation value T_BATT is an estimation value, whereas the discharge performance of the battery 72B and the battery charge amount are non-estimation information. When the replacement of the battery 72B is detected, the automatic driving executability determination unit 105 performs the first process (steps S3B to S6B in FIG. 11) of restricting the automatic driving based on the non-estimation information until the predetermined time tY elapses. According to such a configuration, the battery state can be easily determined even immediately after the battery is replaced, and the automatic driving can be appropriately permitted and restricted.

In addition, when the predetermined time tY elapses, the automatic driving executability determination unit 105 performs the second process (corresponding to steps S8B and S3B to S6B in FIG. 11) of restricting the automatic driving using at least the battery temperature estimation value T_BATT. According to such a configuration, the battery state can be easily and accurately determined based on the battery temperature estimation value T_BATT, and the automatic driving can be appropriately permitted and restricted, thereby the convenience of the user of the vehicle V can be improved.

When the vehicle V is started, the automatic driving executability determination unit 105 performs, as the first process, the discharge test for testing whether the battery 72B can discharge a predetermined amount of current, with the retry cycle tX shorter than the predetermined time tY, and determines whether the automatic driving is restricted based on the non-estimation information including the information obtained by the discharge test. According to such a configuration, when the battery 72B is determined to be in a good state by any of the discharge tests, the restriction of the automatic driving can be canceled and the convenience of the user can be improved.

In addition, since the automatic driving executability determination unit 105 performs, as the second process, the process (corresponding to step S8B) of at least determining whether the automatic driving is restricted, based on the amount of change in the battery temperature estimation value T_BATT from the time point when the automatic driving is permitted, as compared with the case of performing the discharge test, it is possible to easily and quickly determine whether to restrict the automatic driving and to avoid a reduction in the amount of accumulated charge.

Since the retry cycle tX is set to a time shorter than the time during which the voltage of the battery 72B changes by the voltage corresponding to the allowable temperature drop range (corresponding to the margin voltage VB in FIG. 9) when the change from the predetermined high-temperature environment to the low-temperature environment occurs, the retry cycle is set to a time shorter than the time required for the temperature of the battery 72B to drop by a predetermined temperature. According to such a configuration, the discharge test can be performed with the voltage of the battery 72B secured at a voltage capable of guaranteeing the function of the automatic driving control (corresponding to the function guarantee voltage VA in FIG. 9).

In the embodiment, when the mounting of the battery 72B is detected, the automatic driving executability determination unit 105 determines the state of the battery 72B until the predetermined time tY elapses, based on the battery information excluding the battery temperature estimation value T_BATT, determines the state of the battery 72B using the battery temperature estimation value T_BATT when the predetermined time tY elapses, and prohibits the hands-off automatic driving according to the result of each determination, so that it is possible to appropriately restrict the hands-off automatic driving with a high automation rate.

In the vehicle control device 1 of the embodiment, the discharge performance determination unit 102 functions as the first determination unit that determines whether the battery is in the low capacity state due to the actual output of the battery 72B, and the temperature determination unit 103 functions as the second determination unit that determines during the continuation of the automatic driving whether the battery is in the low capacity state due to the temperature of the battery 72B.

When the second determination unit determines that the battery is in the low capacity state, the charge amount determination unit 104 functions as the third determination unit that determines whether the battery is in the low capacity state due to the amount of charge of the battery 72B (corresponding to step S8B→S3B in FIG. 11). Then, when the third determination unit determines that the battery is in the low capacity state, the automatic driving executability determination unit 105 restricts the automatic driving (step S3B→S6B in FIG. 11), and when the second determination unit determines that the battery is in the low capacity state but the third determination unit determines that the battery is not in the low capacity state, the automatic driving executability determination unit 105 determines whether the automatic driving is restricted according to the determination result of the first determination unit (step S8B→S3B to S6B or S7B in FIG. 11).

As a result, it is possible to prevent a situation where the amount of charge of the battery 72B is reduced by the discharge test for testing the performance of the battery 72B, and to enable the automatic driving, thereby the convenience of the user can be improved.

In addition, the discharge performance determination unit 102 (first determination unit) performs the discharge test for testing whether the battery 72B can discharge a predetermined amount of current, and determine based the result of the discharge test whether the battery is in the low capacity state. Since such a discharge test is performed when the battery is not in the low capacity state due to the amount of charge of the battery 72B, the reduction in the battery charge amount can be prevented that occurs when the discharge test is frequently performed. By such a discharge test, it is possible to confirm with high accuracy whether the battery is in a state where the automatic driving can be continued, and it becomes easy to continue the automatic driving.

Further, the charge amount determination unit 104 (third determination unit) determines that the battery is in the low capacity state when the amount of charge of the battery 72B is less than the charge amount threshold value required to continue the predetermined automatic driving (automatic driving of the second control state (hands-off) or higher), and determines that the battery is not in the low capacity state when the amount of charge of the battery exceeds the charge amount threshold value. Thus, the predetermined automatic driving (automatic driving of the second control state (hands-off) or higher) can be performed while a sufficient amount of charge is secured.

In addition, when the battery temperature estimation value T_BATT is reset, the automatic driving is restricted until the predetermined time tY elapses when the charge amount determination unit 104 (third determination unit) or the discharge performance determination unit 102 (first determination unit) determines that the battery is in the low capacity state, the temperature determination unit 103 (second determination unit) determines that the battery is in the low capacity state when the predetermined time tY elapses, and the automatic driving is restricted when the charge amount determination unit 104 (third determination unit) or the discharge performance determination unit 102 (first determination unit) determines that the battery is in the low capacity state. Thus, it is possible to prevent a situation where the automatic driving is restricted, based on the battery temperature estimation value T_BATT when the error is large due to the resetting. In this case, since the automatic driving is restricted when the charge amount determination unit 104 or the discharge performance determination unit 102 determines that the battery is in the low capacity state, the automatic driving can be appropriately restricted.

The charge amount threshold value used when the charge amount determination unit 104 determines that the battery is in the low capacity state is set to a threshold value for securing the amount of charge necessary for maintaining the automatic driving of the second control state (hands-off) or higher. According to such a configuration, the charge amount threshold value capable of maintaining the predetermined automatic driving can be easily set.

In the embodiment, the amount of power consumed during the determination process of the charge amount determination unit 104 is defined as the amount of power consumed in the discharge test, but may be the total amount of power including the amount of power consumption when the power of the battery 72B may be consumed in addition to the discharge test and the amount of power consumed in the discharge test.

In the embodiment, the case is described in which the discharge performance determination unit 102, the temperature determination unit 103, and the charge amount determination unit 104 are used to permit or restrict the hands-off automatic driving, but the present invention is not limited thereto. These units may be used to permit or restrict automatic driving other than the hands-off automatic driving.

Each of the units of the vehicle control device 1 shown in FIGS. 1, 2, and 7 may be realized by one hardware, may be realized by the cooperation of hardware and software, or may be changed as appropriate. Further, the processes corresponding to the respective steps of the flowchart shown in FIGS. 10 and 11 may be divided, may be merged, or may include more processes.

The above-described embodiment is merely an embodiment of the present invention, and can be arbitrarily modified and applied without departing from the gist of the present invention.

REFERENCE SIGNS LIST 1 vehicle control device
1A, 1B control device
6 large-capacity battery (main battery)
7A, 7B power source
20A automatic driving ECU
26B battery management ECU
72A, 72B battery (auxiliary battery)
83 sensor unit
101 information acquisition unit
102 discharge performance determination unit (first determination unit)
103 temperature determination unit (second determination unit)
104 charge amount determination unit (third determination unit)
105 automatic driving executability determination unit (control unit)
V vehicle

What is claimed is:

1. A vehicle control device capable of controlling automatic driving of a vehicle, the vehicle control device comprising a processor, wherein the processor functions as:
   a mounting detection unit configured to detect mounting of a battery on the vehicle;

an information acquisition unit configured to acquire battery information indicating a state of the battery; and a control unit configured to restrict the automatic driving based on the battery information, wherein the battery information includes an estimation value in which information accuracy deteriorates when the battery is mounted or removed, and when the mounting of the battery is detected, by a function of the control unit, the processor performs a process of restricting the automatic driving using the battery information excluding the estimation value until a predetermined time elapses.

2. The vehicle control device according to claim 1, wherein the estimation value is a value obtained using a past estimation value, and the predetermined time is a time during which a discrepancy between the estimation value and a measured value falls within an allowable range.

3. The vehicle control device according to claim 1, wherein the battery information includes the estimation value and non-estimation information regarding output performance of the battery, and when the mounting of the battery is detected, the control unit performs a first process of restricting the automatic driving based on the non-estimation information until the predetermined time elapses and performs a second process of restricting the automatic driving using at least the estimation value when the predetermined time elapses.

4. The vehicle control device according to claim 3, wherein the control unit performs, as the first process, a discharge test for testing whether the battery is capable of discharging a predetermined amount of current when the vehicle is started, in a cycle shorter than the predetermined time, acquires information obtained by the discharge test as the non-estimation information, and determines based on the acquired information whether to restrict the automatic driving.

5. The vehicle control device according to claim 4, wherein the estimation value includes a battery temperature estimation value that is an estimation value of a liquid temperature of the battery, and the control unit performs, as the second process, at least a process of determining whether to restrict the automatic driving, based on an amount of change in the battery temperature estimation value from a time point when the automatic driving is permitted.

6. The vehicle control device according to claim 4, wherein the cycle is set to a time shorter than a time required for a temperature of the battery to drop by a predetermined temperature.

7. The vehicle control device according to claim 1, wherein when the mounting of the battery is detected, the control unit is configured to:

determine the state of the battery based on the battery information excluding the estimation value until the predetermined time elapses, determine the state of the battery using the estimation value when the predetermined time elapses, and prohibit hands-off automatic driving according to a result of each determination.

8. A non-transitory computer-readable memory that records an automatic driving program causing a computer, having a processor, to execute an automatic driving process of a vehicle, wherein the automatic driving program causes the computer to execute, by the processor:

a process of detecting mounting of a battery on the vehicle, a process of acquiring battery information indicating a state of the battery, and a process of restricting the automatic driving process based on the battery information, the battery information includes an estimation value in which information accuracy deteriorates when the battery is mounted or removed, and when the mounting of the battery is detected, the automatic driving program causes the processor to restrict the automatic driving process using the battery information excluding the estimation value until a predetermined time elapses.

* * * * *